United States Patent
Kayanoki et al.

(12)

(10) Patent No.: US 10,926,440 B2
(45) Date of Patent: Feb. 23, 2021

(54) LAMINATE SHEET AND MOLDED BODY, AND METHODS FOR PRODUCING THE SAME

(71) Applicant: SEIREN CO., LTD., Fukui (JP)

(72) Inventors: Tsuyoshi Kayanoki, Fukui (JP); Shuya Takashima, Fukui (JP)

(73) Assignee: Seiren Co., Ltd., Fukui (JP)

( * ) Notice: Subject to any disclaimer, the term of this patent is extended or adjusted under 35 U.S.C. 154(b) by 550 days.

(21) Appl. No.: 14/861,279

(22) Filed: Sep. 22, 2015

(65) Prior Publication Data

US 2016/0089849 A1    Mar. 31, 2016

(30) Foreign Application Priority Data

Sep. 26, 2014   (JP) .............................. JP2014-196959

(51) Int. Cl.
*B29C 45/14*     (2006.01)
*B32B 27/20*     (2006.01)
(Continued)

(52) U.S. Cl.
CPC .. *B29C 45/14688* (2013.01); *B29C 45/14811* (2013.01); *B29C 69/00* (2013.01);
(Continued)

(58) Field of Classification Search
CPC .... B32B 3/00; B32B 3/26; B32B 3/28; B32B 3/30; B32B 3/263; B32B 7/00;
(Continued)

(56) References Cited

U.S. PATENT DOCUMENTS

| 5,395,231 A * | 3/1995 | Maejima | ................. B29C 48/30 |
| | | | 425/466 |
| 2007/0026197 A1* | 2/2007 | Suga | ...................... B32B 3/263 |
| | | | 428/141 |

(Continued)

FOREIGN PATENT DOCUMENTS

| CN | 101873778 A | 10/2010 | |
| EP | 2168762 A1 * | 3/2010 | ............. B32B 27/08 |

(Continued)

OTHER PUBLICATIONS

Machine translation of JP 02-128843 A (JPlatPat). Translated Mar. 12, 2018. (Year: 2018).*

(Continued)

*Primary Examiner* — Maria V Ewald
*Assistant Examiner* — Ethan A. Utt
(74) *Attorney, Agent, or Firm* — Norris McLaughlin, P.A.

(57) ABSTRACT

Provided is a laminate sheet in which, on one surface of a resin layer having optical transparency, a colored layer and a backing layer are sequentially laminated, and on the other surface of the resin layer, a pattern layer made of an ionizing radiation curable resin and having optical transparency is laminated. The pattern layer has a softening temperature of 140 to 160° C., and the resin layer, the colored layer, and the backing layer have softening temperatures of 120° C. or lower. The surface of the pattern layer has a concavo-convex shape and the thickness thereof is continuously varied.

6 Claims, 4 Drawing Sheets (51) Int. Cl.
| | |
|---|---|
| *B32B 27/08* | (2006.01) |
| *B32B 27/18* | (2006.01) |
| *B44F 9/02* | (2006.01) |
| *B32B 27/30* | (2006.01) |
| *B29C 69/00* | (2006.01) |
| *B32B 38/00* | (2006.01) |
| *B32B 27/36* | (2006.01) |
| *B32B 27/32* | (2006.01) |
| *B32B 27/40* | (2006.01) |
| *B32B 7/12* | (2006.01) |
| *B44C 1/17* | (2006.01) |

(52) U.S. Cl.
CPC ............... *B32B 7/12* (2013.01); *B32B 27/08* (2013.01); *B32B 27/18* (2013.01); *B32B 27/20* (2013.01); *B32B 27/302* (2013.01); *B32B 27/304* (2013.01); *B32B 27/308* (2013.01); *B32B 27/32* (2013.01); *B32B 27/36* (2013.01); *B32B 27/365* (2013.01); *B32B 27/40* (2013.01); *B32B 38/145* (2013.01); *B29K 2995/002* (2013.01); *B29K 2995/0026* (2013.01); *B32B 2250/24* (2013.01); *B32B 2255/10* (2013.01); *B32B 2255/26* (2013.01); *B32B 2270/00* (2013.01); *B32B 2307/402* (2013.01); *B32B 2307/4023* (2013.01); *B32B 2307/412* (2013.01); *B32B 2307/71* (2013.01); *B32B 2307/712* (2013.01); *B32B 2309/02* (2013.01); *B32B 2310/0812* (2013.01); *B32B 2419/00* (2013.01); *B32B 2451/00* (2013.01); *B32B 2509/00* (2013.01); *B32B 2605/00* (2013.01); *B32B 2607/00* (2013.01); *B44C 1/1712* (2013.01); *B44F 9/02* (2013.01)

(58) Field of Classification Search
CPC ........... B32B 7/02; B32B 7/027; B32B 27/00; B32B 27/06; B32B 27/08; B32B 27/18; B32B 27/20; B32B 27/28; B32B 27/30; B32B 27/32; B32B 27/34; B32B 27/36; B32B 27/38; B32B 27/40; B32B 27/281; B32B 27/302; B32B 27/304; B32B 27/306; B32B 27/308; B32B 27/322; B32B 27/325; B32B 27/327; B32B 27/365; B32B 2250/00; B32B 2250/04; B32B 2250/05; B32B 2250/24; B32B 2250/246; B32B 2323/00; B32B 2323/04; B32B 2323/10; B32B 2323/043; B32B 2323/046; B32B 2325/00; B32B 2327/00; B32B 2327/06; B32B 2333/00; B32B 2333/04; B32B 2333/08; B32B 2333/12; B32B 2355/00; B32B 2355/02; B32B 2367/00; B32B 2369/00; B32B 2375/00; B32B 2451/00; Y10T 428/26; Y10T 428/27; Y10T 428/263; Y10T 428/264; Y10T 428/265; Y10T 428/266; Y10T 428/269; Y10T 428/273; Y10T 428/2438; Y10T 428/2443; Y10T 428/2446; Y10T 428/2457; Y10T 428/2462; Y10T 428/2495; Y10T 428/3158; Y10T 428/3192; Y10T 428/24355; Y10T 428/24364; Y10T 428/24372; Y10T 428/24388; Y10T 428/24397; Y10T 428/24405; Y10T 428/24413; Y10T 428/24421; Y10T 428/24438; Y10T 428/24446; Y10T 428/24471; Y10T 428/24479; Y10T 428/24521; Y10T 428/24529; Y10T 428/24537; Y10T 428/24545; Y10T 428/24579; Y10T 428/24587; Y10T 428/24612; Y10T 428/24628; Y10T 428/24669–24736; Y10T 428/24942; Y10T 428/24967; Y10T 428/24975; Y10T 428/31504; Y10T 428/31507; Y10T 428/31551; Y10T 428/31554; Y10T 428/31565; Y10T 428/31573; Y10T 428/31587; Y10T 428/31786; Y10T 428/31794; Y10T 428/31797; Y10T 428/31855; Y10T 428/31909; Y10T 428/31913; Y10T 428/31928; Y10T 428/31935; Y10T 428/31938; C08L 23/00; C08L 23/04; C08L 23/06; C08L 23/08; C08L 23/10; C08L 23/12; C08L 23/14; C08L 23/18; C08L 23/20; C08F 10/00; C08F 10/02; C08F 10/04; C08F 10/06; C08F 10/08; C08F 110/00; C08F 110/02; C08F 110/04; C08F 110/06; C08F 110/08; C08F 210/00; C08F 210/02; C08F 210/04; C08F 210/06; C08F 210/08; B44F 9/00; B44F 9/02
USPC ............... 428/141–152, 155, 156, 161–164, 428/167–169, 172, 173, 174, 179–187, 428/212, 213, 215, 216, 219, 220, 332, 428/334–337, 339–341, 411.1, 412, 428/423.1, 423.3, 423.7, 424.2, 424.6, 428/424.8, 480, 482, 483, 500, 515, 516, 428/518, 520, 522, 523, 542.2, 542.6
See application file for complete search history.

(56) References Cited

U.S. PATENT DOCUMENTS

| | | | |
|---|---|---|---|
| 2009/0246475 | A1 | 10/2009 | Hirata et al. |
| 2011/0268900 | A1 | 11/2011 | Lin et al. |
| 2013/0269862 | A1 | 10/2013 | Hsu et al. |

FOREIGN PATENT DOCUMENTS

| | | | | | |
|---|---|---|---|---|---|
| JP | 02128843 | A | * | 5/1990 | |
| JP | 03252472 | A | * | 11/1991 | |
| JP | 07137221 | A | * | 5/1995 | |
| JP | 08238739 | A | * | 9/1996 | |
| JP | 3003034 | | | 1/2000 | |
| JP | 2002-264289 | A | | 9/2002 | |
| JP | 2007268740 | A | * | 10/2007 | |
| JP | 2007-283704 | A | | 11/2007 | |
| JP | 2009-234159 | A | | 10/2009 | |
| JP | 2010-082912 | | | 4/2010 | |
| JP | 2010-106654 | A | | 5/2010 | |
| JP | 2012-051218 | | | 3/2012 | |
| JP | 2012-192652 | A | | 10/2012 | |
| JP | 2014-201008 | | | 10/2014 | |
| WO | WO-2009150954 | A1 | * | 12/2009 | ............ B05D 7/544 |

OTHER PUBLICATIONS

Machine translation of JP 07-137221 A (Espacenet). Translated Feb. 9, 2018 (Year: 2018).*
Machine translation of WO 2009/150954 A1 (Google patents). Translated Mar. 13, 2018. (Year: 2018).*
Machine translation of JP 03-252472 A (Espacenet). Translated Mar. 15, 2018. (Year: 2018).*
Rao, Natti O'Brien, Keith. (1998). Design Data for Plastics Engineers—2.9 Vicat Softening Point. Hanser Publishers. Online version available at: app.knovel.com/hotlink/pdf/id:kt003RPMAB/design-data-plastics/vicat-softening-point (Year: 1998).*

(56) References Cited

OTHER PUBLICATIONS

Machine translation (Espacenet) of JP 2007-268740 A. Translated Apr. 11, 2019. (Year: 2019).*
Machine translation (Espacenet) of JP 08-238739 A. Translated Apr. 25, 2020. (Year: 2020).*

* cited by examiner

COMPARATIVE EXAMPLE

LAMINATE SHEET AND MOLDED BODY, AND METHODS FOR PRODUCING THE SAME

CROSS-REFERENCE TO RELATED APPLICATIONS

This application is based upon and claims the benefit of priority from the prior Japanese Patent Application No. 2014-196959, filed on Sep. 26, 2014; the entire contents of which are incorporated herein by reference.

BACKGROUND

1. Technical Field

The present invention relates to a laminate sheet, a molded body using the same, and methods for producing the laminate sheet and the molded body.

2. Related Art

Laminate sheets have heretofore been used for decoration of various parts of home electronic appliances, automobiles, office automation apparatuses, building materials, and the like. An added value of such a part (molded body) has been enhanced by providing on a surface of the part a laminate sheet having, for example, a metal hairline-like, a wood grain-like, or a carbon cloth-like pattern applied thereon.

Recently, product development has been made to bring the patterns closer to real metal hairline, wood grain, carbon cloth, and the like, for further enhancing the added value. For example, a part in which a three-dimensional design is added to a metal hairline-like, wood grain-like, carbon cloth-like pattern or the like by imparting a concavo-convex shape on the surface thereof is favored. Such a part may be produced by a film insert molding method. In the film insert molding method, a laminate sheet having a desired pattern applied thereon is first shaped into a desired part surface shape by using a heat molding method, such as a vacuum molding method and a pressure molding method, thereby producing a shaped body. Subsequently, the shaped body is placed in a mold cavity and a molten resin is injected therein, thereby integrating the shaped body with the resin molded body.

As the method for imparting a three dimensional pattern on a part surface, there are a method of previously imparting a concavo-convex shape on a surface of a laminate sheet by embossing or other processes, a method of previously subjecting an inner surface of a mold cavity to an emboss processing, thereby imparting a concavo-convex shape to the part surface in the film insert molding, and the like. In the former method, however, the concavo-convex shape of the surface is often not maintained owing to heat or pressure applied in the heat molding for producing the shaped body or in the film insert molding. In the latter method, when changing the design, a mold is required for each design, causing a problem of the production cost increase. In addition, in a concavo-convex shape obtained by those methods, the concavo-convex is sometimes lost by scrapes in use in a desired application.

For resolving the problems, there has been proposed a method of laminating a pattern layer on the rear surface side of a transparent substrate film having a flat surface to impart a concavo-convex shape to the pattern layer and the transparent substrate film from the rear surface side. Alternatively, there has been proposed a method of imparting a concavo-convex shape on the surface of a pattern layer of a laminate sheet, applying a transparent protective layer on the surface having the concavo-convex shape, further covering the surface of the protective layer with a flat transparent sheet, and subjecting the laminate sheet to film insert molding. Those methods are effective to maintain a three dimensionality of the pattern layer during the production of the resin molded body, and to prevent the loss of the concavo-convex shape due to scrapes in use (see, JP-A-2010-82912 and JP-A-2012-51218). However, in those methods, in order to impart a three-dimensional design to a pattern layer, the pattern layer is laminated on an printing original plate or a substrate film having a flat surface by a printing method such as photogravure and screen printing, and a concavo-convex shape is formed on the printing original plate or substrate film including the pattern layer by an embossing process. Accordingly, although the product has a three dimensional design, the pattern layer does not show a depth feeling since the pattern layer itself has almost no transparency and has little variation in thickness.

On the other hand, there is a technique in which a transparent, flat convex-mounting pattern portion having a constant height (thickness) is formed by a printing method such as photogravure and screen printing not entirely but partially on a base material sheet (see, Japanese Patent No. 3003034). In this case, a concavo-convex shape is formed by the convex-mounting pattern portion formed partially on the base material sheet and the other portion, thereby allowing the design to have a three-dimensionality. However, since the convex-mounting pattern portion is a convex portion which has a flat top and has a constant height (thickness), the three-dimensionality is felt to be monotonous. In addition, since the convex portion of Japanese Patent No. 3003034 is not varied in height (thickness), composite variation of the pattern layer and the colored layer is poor, and in spite of the existing depth, variation thereof (feeling of the depth) is poor.

It is demanded to express, not a monotonous design which has three-dimensionality but does not have variation in thickness in the pattern layer itself and is poor in the depth feeling, but a design that has three-dimensionality and variation thereof in the pattern layer and further has a depth feeling. Also, it is demanded to express a design that has an irregular three-dimensionality and a depth feeling like in real metal hairline, wood grain, carbon cloth, and the like, and further a new design that is a combination of a natural material and a processed material while also having a three-dimensionality and variation thereof and a depth feeling.

SUMMARY

An embodiments have an object to solve the problem mentioned above and provide a laminate sheet which, when integrated with a molded resin layer by a molding method such as injection molding to form a molded body, can express a design that has a desired three dimensionality and variation thereof and further has a depth feeling, while the surface of the molded body is flat, and also provide a molded body in which the laminate sheet is integrated with a molded resin layer.

A first embodiment provides a laminate sheet comprising a resin layer which has optical transparency and a softening temperature of 120° C. or lower, a colored layer which is laminated on one surface of the resin layer and has a softening temperature of 120° C. or lower, a backing layer which is laminated on the colored layer and has a softening temperature of 120° C. or lower, and a pattern layer which is laminated on the other surface of the resin layer, is made of an ionizing radiation curable resin, and has optical transparency, wherein the pattern layer has a softening temperature of 140 to 160° C., the surface of the pattern layer has a concavo-convex shape, and the thickness thereof is continuously varied.

A second embodiment provides a method for producing a laminate sheet, comprising: sequentially laminating, on one surface of a resin layer which has optical transparency and a softening temperature of 120° C. or lower, a colored layer having a softening temperature of 120° C. or lower and a backing layer having a softening temperature of 120° C. or lower; and subsequently applying an ionizing radiation curable resin ink on the other surface of the resin layer, and irradiating the ionizing radiation curable resin ink with an ionizing radiation, thereby forming a pattern layer which has optical transparency and a softening temperature of 140 to 160° C., whose surface has a concavo-convex shape and whose thickness is continuously varied.

A third embodiment provides a molded body comprising the laminate sheet and a molded resin layer which is integrated with the laminate sheet, wherein the surface of the pattern layer is flat and the backing layer is in contact with the molded resin layer.

A fourth embodiment provides a method for producing the molded body, comprising: placing the laminate sheet in a mold cavity with the pattern layer side facing a mold cavity surface; injecting a resin on the backing layer side of the laminate sheet; and molding the molded resin layer while pressing the pattern layer side against the mold cavity surface.

The embodiments can provide a laminate sheet which, when integrated with a molded resin layer by a molding method such as injection molding to form a molded body, can express a design that has a desired three dimensionality and variation thereof and further has a depth feeling, while the surface of the molded body is flat, and can also provide a molded body in which the laminate sheet is integrated with a molded resin layer.

DETAILED DESCRIPTION

Hereinafter, the embodiments will be described in detail with reference to the drawings.

Figure 1:
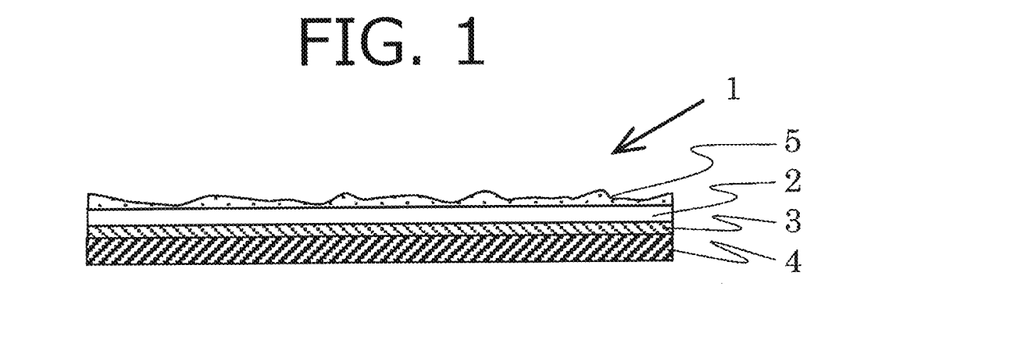
FIG. 1 is a cross sectional view schematically showing a laminate sheet according to an embodiment.

FIG. 1 schematically shows a cross section of a laminate sheet according to one embodiment. A laminate sheet 1 is a laminate sheet in which a colored layer 3 and a backing layer 4 are sequentially laminated on one surface of a resin layer 2 having optical transparency, and a pattern layer 5 which is made of an ionizing radiation curable resin and has optical transparency is laminated on the other surface of the resin layer 2, the surface of the pattern layer 5 having a concavo-convex shape and the thickness of the pattern layer 5 being continuously varied. As a method for producing the laminate sheet 1, a method comprising: sequentially laminating the colored layer 3 and the backing layer 4 on one surface of the resin layer 2; and then applying an ionizing radiation curable resin ink on the other surface of the resin layer 2 and irradiating the ionizing radiation curable resin ink with an ionizing radiation to form the pattern layer 5, is exemplified. As used herein, the surface of the pattern layer refers to the front surface of the pattern layer. Similarly, the surface of the molded body refers to the front surface of the molded body.

The resin layer 2 is a sheet having optical transparency, and a commercially available film or a resin cured previously may be used therefor. Since the resin layer 2 has optical transparency, the colored layer 3 can be visually recognized through the pattern layer 5 and the resin layer 2, and further the thicknesses of the pattern layer 5 and the resin layer 2 can be visually recognized. The optical transparency of the resin layer 2 is preferably 80% or more in the wavelength range of 400 to 700 nm.

Examples of the resin for forming the resin layer 2 include a thermoplastic resin, such as an acrylic resin, a polycarbonate resin, a polyethylene terephthalate resin, a polybutylene terephthalate resin, an acrylonitrile butadiene styrene resin, a polyethylene resin, a polypropylene resin, a polystyrene resin, and a polyvinyl chloride resin; and a thermosetting resin, such as a polyurethane resin and an unsaturated polyester resin. The resin layer 2 may be a composite or a laminate of two or more of the resins. The composite means a resin layer made of a mixture of two or more resins, and the laminate means a resin layer obtained by laminating two or more resin layers having different resin compositions. Among them, from the viewpoint of easiness of heat molding, a thermoplastic resin is preferred, and specifically any one resin selected from the group consisting of an acrylic resin, a polycarbonate resin, a polyethylene terephthalate resin, a polybutylene terephthalate resin, an acrylonitrile butadiene styrene resin, a polyethylene resin, a polypropylene resin, a polystyrene resin, and a polyvinyl chloride resin, or a composite or a laminate of two or more of the resins is preferred.

An additive, such as a dispersant, a heat stabilizer, a thermal radical polymerization inhibitor, a light stabilizer, an antioxidant, a preservative, a pH adjuster, an antifoaming agent, and a penetrant, may be added to the resin for forming the resin layer 2 as required.

The resin layer 2 may be colored using one or more colorants, such as a pigment and a dye, to the extent that the optical transparency is not inhibited. The coloring may be an entirely uniform coloring or a partial coloring, or also may be a coloring having a differently colored part. When weather resistance or light resistance is demanded, it is preferred to use a pigment.

The thickness of the resin layer 2 is not particularly limited, and preferably 50 to 200 μm. A thickness of 50 μm or more enhances strength to improve handleability in a post-processing, and also enhances the depth feeling. When the thickness is 200 μm or less, deterioration in heat moldability can be inhibited, and therefore an accurate shape is easily made. The thickness of the resin layer 2 is more preferably 50 to 150 μm. The thickness of the resin layer 2 is preferably constant.

The resin layer 2 preferably has a softening temperature of 120° C. or lower, more preferably 100° C. or lower. By the softening temperature being 120° C. or lower, when a molded body 7 is formed by a molding method such as injection molding, the resin layer 2 can be reshaped to sink in and a concavo-convex shape of the surface of the pattern layer 5 can be easily reshaped into a flat surface. The lower limit of the softening temperature of the resin layer 2 is not particularly limited, and may be, for example, 80° C. or higher.

The colored layer 3 is a layer for coloring the laminate sheet 1. The colored layer 3 does not penetrate but reflects light, thereby enhancing the three-dimensionality. The method of forming the colored layer 3 is not particularly limited, and may be a method of laminating the layer on the resin layer 2 using a known coater such as, for example, a reverse roll coater, a knife coater and a comma coater.

Examples of the resin for forming the colored layer 3 include a thermoplastic resin such as a polyester resin, an acrylic resin and a vinyl chloride-based resin. The resin may be a composite or a laminate of two or more of the resins.

The colored layer 3 is colored using one or more colorants, such as a pigment and a dye. When weather resistance or light resistance is demanded, it is preferred to use a pigment. As the pigment, either of an organic or an inorganic pigment may be used. Examples of the organic pigment include nitroso compounds, dyeing lakes, azo lakes, insoluble azo compounds, monoazo compounds, disazo compounds, condensed azo compounds, benzimidazolones, phthalocyanines, anthraquinones, perylenes, quinacridones, dioxazines, isoindolines, azomethines, and pyrrolopyrroles. Examples of the inorganic pigment include oxides, hydroxides, sulfides, ferrocyanides, chromates, carbonates, silicates, phosphates, carbons (carbon black), and metal powders.

The color of the colored layer 3 is not particularly limited. From the viewpoint of enhancing the three-dimensionality, a glitter pigment is preferably contained to allow light to be easily reflected on an interface of a concavo-convex shape with the resin layer 2. Alternatively, the colored layer 3 may be a composite colored layer in which a metal evaporated film having an effect of reflecting light is laminated in addition to a colored layer. In cases of the composite colored layer, it is sufficient to color a part thereof, and, for example, a metal evaporated film may be laminated intentionally on a non-colored transparent layer to emphasize the metallic feeling.

As a typical glitter pigment, two types, a metallic pigment showing a metallic gloss and a pearl pigment showing a pearl-like gloss, may be exemplified. Examples of the metallic pigment include powder or flakes of a metal such as aluminum and copper, powder or flakes of a metal alloy such as brass, and fine cut pieces of a metal evaporated film. Examples of the pearl pigment include a natural or synthetic mica coated with one layer or two or more layers of a metal oxide such as titanium oxide, silicon oxide and iron oxide, fine cut pieces of a film in which resin layers showing different light refractions are laminated, pearl powder, powder of an inner wall of a shell, and argentine.

An additive, such as a dispersant, a heat stabilizer, an antioxidant, a preservative, a pH adjuster, an antifoaming agent, and a penetrant, may be added to the colored layer 3 as required.

The optical transparency of the colored layer 3 is preferably lower than those of the resin layer 2 and the pattern layer 5 from the viewpoint of enhancing the three-dimensionality. That is, the three-dimensionality can be obtained by light after passing through the pattern layer 5 and the resin layer 2 being reflected on the colored layer 3. For this reason, it is desirable that light does not penetrate the layers to reach the backing layer 4 which is an under layer, that is, the backing layer 4 is hidden or shielded by the colored layer 3. From the viewpoint of the shielding property, the optical transparency of the colored layer 3 is preferably 10% or less, more preferably 5% or less, and still more preferably 0%, in the wavelength range of 400 to 700 nm.

The thickness of the colored layer 3 is not particularly limited, but preferably 20 to 80 μm. A thickness of 20 μm or more gives an excellent shielding property. When the thickness is 80 μm or less, deterioration in heat moldability is inhibited, and therefore an accurate shape is easily formed. The thickness of the colored layer 3 is more preferably 30 to 60 μm. The thickness of the colored layer 3 is preferably constant.

The softening temperature of the colored layer 3 is 120° C. or lower, and preferably 100° C. or lower. By the softening temperature being 120° C. or lower, when the molded body 7 is formed by a molding method such as injection molding, a concavo-convex shape on the surface of the pattern layer 5 is easily reshaped to a flat surface. Accordingly, as the concavo-convex shape on the surface of the pattern layer 5 is reshaped to the flat surface, the resin layer 2 and the colored layer 3 are easily reshaped to a sunken shape. The lower limit of the softening temperature of the colored layer 3 is not particularly limited, and may be, for example, 80° C. or higher.

The backing layer 4 is a layer for enabling melt bonding (adhering) with a resin for forming a molded resin layer 6 when the molded body 7 is produced by a molding method such as injection molding. Also, the backing layer 4 is a layer for protecting the colored layer 3 which is one of layers constituting the laminate sheet 1. The method for producing the backing layer 4 is not particularly limited, and may be a method of laminating a resin sheet on the surface of the colored layer 3, for example, by a heat lamination process or the like.

Examples of the resin for forming the backing layer 4 include a thermoplastic resin, such as an acrylic resin, a polycarbonate resin, a polyethylene terephthalate resin, a polybutylene terephthalate resin, an acrylonitrile butadiene styrene resin, a polyethylene resin, a polypropylene resin, a polystyrene resin, and a polyvinyl chloride resin; and a thermosetting resin, such as a polyurethane resin and an unsaturated polyester resin. The resin may be a composite or a laminate of two or more of the resins. Among them, from the viewpoints of easiness of heat molding and protection of the colored layer 3, a thermoplastic resin is preferred, and specifically any one resin selected from the group consisting of an acrylic resin, a polycarbonate resin, an acrylonitrile butadiene styrene resin, a polyethylene resin, a polypropylene resin, a polystyrene resin, and a polyvinyl chloride resin, or a composite or a laminate of two or more of the resins is preferred.

From the viewpoint of the adhesion in the formation of the molded body 7, the resin for forming the backing layer 4 is preferably a thermoplastic resin of the same series as, a resin used for the molded body 7 which is produced by a molding method such as injection molding, that is, a resin for forming the molded resin layer 6.

The thickness of the backing layer 4 is not particularly limited, and is preferably 200 to 400 µm. When the thickness is 200 µm or more, the colored layer 3 can be protected from damage due to heat, pressure, and the like in molding. When 400 µm or less, deterioration in heat moldability can be inhibited, and therefore an accurate shape is easily made. The thickness of the backing layer 4 is more preferably 200 to 300 µm. The thickness of the backing layer 4 is preferably constant.

The softening temperature of the backing layer 4 is 120° C. or lower, preferably 100° C. or lower, and more preferably 90° C. or lower. By the softening temperature being 120° C. or lower, when the molded body 7 is formed by a molding method such as injection molding, a concavo-convex shape on the surface of the pattern layer 5 is easily reshaped to a flat surface. Accordingly, as the concavo-convex shape on the surface of the pattern layer 5 is reshaped to the flat surface, the resin layer 2, the colored layer 3 and the backing layer 4 are easily reshaped to a sunken shape. The softening temperature of the backing layer 4 is preferably lower than those of the resin layer 2 and the colored layer 3. By this configuration, even if the thickness of the backing layer 4 is larger than those of the resin layer 2 and the colored layer 3, when the molded body 7 is formed by a molding method such as injection molding, it is possible to make a state where the interface between the pattern layer 5 and the resin layer 2, the interface between the resin layer 2 and the colored layer 3, and the interface between the colored layer 3 and the backing layer 4 have concavo-convex shapes which are parallel to one another. The lower limit of the softening temperature of the backing layer 4 is not particularly limited, and may be, for example, 60° C. or higher.

The pattern layer 5 is a layer for imparting a pattern (the pattern herein has a concept including a drawing pattern and a regular pattern) to the laminate sheet 1. By the pattern layer being a layer having variation in thickness (a concavo-convex layer), when the molded body 7 is produced by a molding method such as injection molding, the resin layer 2, the colored layer 3, and the backing layer 4 can be reshaped.

A resin for forming the pattern layer 5 is a cured resin having optical transparency, and an ionizing radiation curable resin. The ionizing radiation curable resin can produce a surface having a concavo-convex shape in an easy manner and in a short time, and is suitable for a use requiring production with processing. By forming a surface having a concavo-convex shape, when molding the molded resin layer 6, it is possible to reshape the interface between the pattern layer 5 and the resin layer 2 and the interface between the resin layer 2 and the colored layer 3 into concavo-convex shapes as described later. When the interfaces are reshaped into a concavo-convex shape in this manner, diffuse reflection of incident light occurs, the composite appearance of the resin layer 2 and the colored layer 3 which is viewed through the pattern layer 5 is changed by only a slight change in the incident angle of the light or in the viewing position. Accordingly, a combination of a depth feeling by variation in the thickness of the pattern layer itself and a three-dimensionality which is felt by the diffused reflection of the light on the curved surface of the concavo-convex shape makes it possible to express a unique design.

A known UV curable resin and electron beam curable resin can be used as the ionizing radiation curable resin. For example, a resin having an acrylic functional group is preferred and in terms of having great versatility to provide a wide variety of cured resins, an acrylic UV curable resin is more preferred. The acrylic UV curable resin is basically constituted of a photoinitiator, a reactive monomer and a reactive oligomer. By being irradiated with UV light, the photoinitiator becomes radicals to activate functional groups of the reactive monomer and reactive oligomer and the monomer and oligomer sequentially bind to each other into a chain form to convert into a polymer (acrylic resin).

The softening temperature of the pattern layer 5 is 140 to 160° C. When in this range, the laminate sheet 1 is easily shaped into a desired design shape using a heat molding method such as vacuum molding and pressure molding, and when the molded body 7 is formed by a molding method such as injection molding, a concavo-convex shape on the surface of the pattern layer 5 is easily reshaped into a flat surface. That is, by the softening temperature being 140° C. or higher, upon molding the molded body 7, the concavo-convex shape on the surface of the pattern layer 5 is easily reshaped into a flat surface while maintaining the continual thickness variation of the patter layer 5 itself. When the softening temperature is 160° C. or lower, the laminate sheet 1 is easily shaped into a desired design shape using a heat molding method.

The pattern layer 5 is preferably colored using one or more colorant such as a pigment and a dye to the extent that the optical transparency is not inhibited. The coloring may be an entirely uniform coloring or a partial coloring, or also may be a coloring having a differently colored part. When weather resistance or light resistance is demanded, it is preferred to use a pigment. As the pigment, either of an organic or an inorganic pigment may be used. Examples of the organic pigment include nitroso compounds, dyeing lakes, azo lakes, insoluble azo compounds, monoazo compounds, disazo compounds, condensed azo compounds, benzimidazolones, phthalocyanines, anthraquinones, perylenes, quinacridones, dioxazines, isoindolines, azomethines, and pyrrolopyrroles. Examples of the inorganic pigment include oxides, hydroxides, sulfides, ferrocyanides, chromates, carbonates, silicates, phosphates, carbons (carbon black), and metal powders.

An additive, such as a sensitizer for promoting an initial reaction of photoinitiator, a dispersant, a heat stabilizer, a thermal radical polymerization inhibitor, an antioxidant, a preservative, a pH adjuster, an antifoaming agent, and a penetrant, may be added to the pattern layer 5 as required.

By allowing the pattern layer 5 to contain a colorant such as pigment to make the pattern layer 5 colored while securing the optical transparency, it is possible to make a design having a composite appearance of the pattern layer 5, the resin layer 2 and the colored layer 3. That is, when the resin layer 2 and the colored layer 3 are viewed from the pattern layer 5 side, the color of the pattern layer 5 itself and the color of the resin layer 2 and the colored layer 3 under the pattern layer 5 show an overlapped appearance. For example, by giving a light color to the pattern layer 5 and giving a dark color to the resin layer 2 or the colored layer 3 under the pattern layer 5, a design can be made in which while showing a feeling of the thickness of the pattern layer 5, a three-dimensionality shown by the overlap with a color of the resin layer 2 or the colored layer 3 and variation thereof, and further a depth feeling are easily and clearly recognized. In addition, even if the pattern layer 5 is colorless and transparent, variation in thickness of the pattern layer is felt by variation in light reflection, whereby a similar effect can be obtained.

A laminate including a combination of the resin layer 2 and the pattern layer 5 preferably has in at least a part thereof an optical transparency of 10% or more in the wavelength range of 400 to 700 nm. Further, the laminate may have different optical transparencies in different parts. By the variation of the optical transparency, the depth feeling can be enhanced. In addition, a part not having a depth feeling may be provided as required. The optical transparency of the part is preferably less than 10%. By the part having a depth feeling and the part not having a depth feeling existing in a mixed manner, a design rich in variation as a whole design can be obtained. In cases where the part having a depth feeling and the part not having a depth feeling exist in a mixed manner, in the measurement of the optical transparency, measurements are made at 10 points each for the part having a depth feeling and the part not having a depth feeling, and it is preferred that all the respective values of the optical transparency of the part having a depth feeling are 10% or more, and all the respective values of the optical transparency of the part not having a depth feeling are less than 10%.

The surface of the pattern layer 5 has a concavo-convex shape (that is, uneven shape), and the interface thereof with the resin layer 2 is flat (that is, even or smooth). The thickness of the pattern layer 5 is thus not constant but varied continuously. With this configuration, when a design showing a composite appearance of the pattern layer 5, the resin layer 2, and the colored layer 3 is produced as described above, even if the coloring density of the pattern layer 5 is constant, there occurs a difference in apparent density (color strength) due to the variation in the thickness. Thus, a design showing a three-dimensionality and variation thereof, and further showing a depth feeling, can be expressed. The thickness of the pattern layer 5 is not particularly limited, and can be set depending on the demanded design. The thickness of the pattern layer 5 according to one embodiment may be 5 to 50 μm, and may be 10 to 30 μm, in the thickness of the thinnest part. The thickness may be 30 to 150 μm, and may be 50 to 100 μm, in the thickness of the thickest part.

In this embodiment, in the pattern layer 5 whose thickness is a continuously varied, an upper edge of a cross section is constituted of plural curves having different radii of curvature sequentially connected. That is, in a cross section obtained by cutting the pattern layer 5 in a thickness direction, the upper edge of the pattern layer 5 has a shape having curves with different radii of curvature connected sequentially. The radii of curvature of the plural curves constituting an upper edge of a cross section of the pattern layer 5 are preferably within the range of, for example, 17.5 μm to 100 mm, and may be within the range of 17.5 to 1000 μm.

In this embodiment, in the pattern layer 5 whose thickness is continuously varied, cross-sectional shapes of the pattern layer 5 in plural cross sections that are parallel to one another are different. That is, the pattern layer 5 is continuously varied in the cross-sectional shape in an arbitrary cross section. This will be described in detail below.

Figure 2:
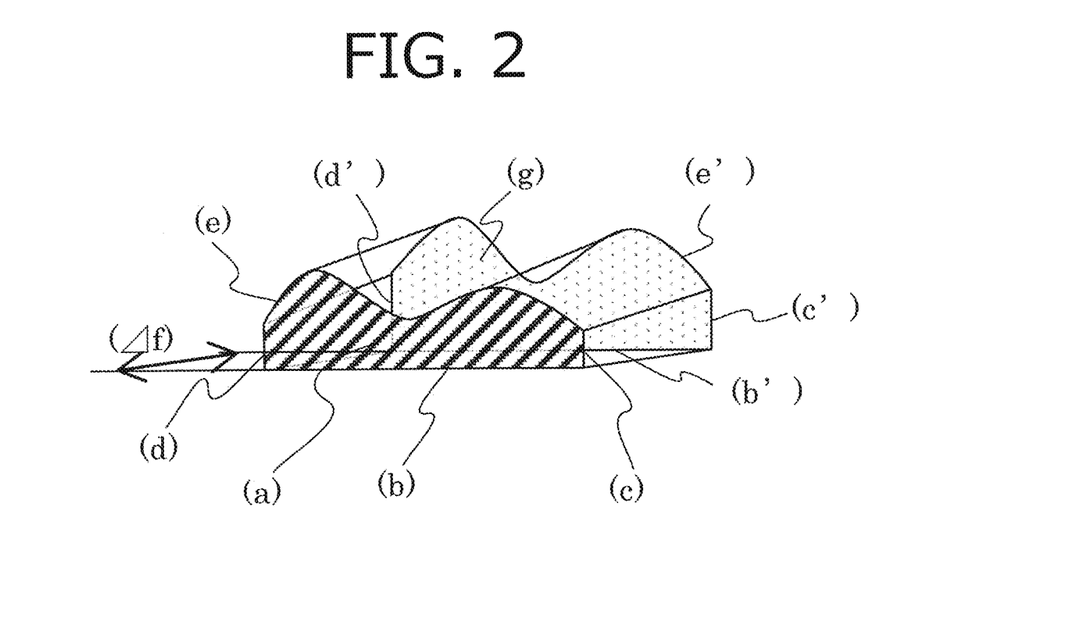
FIG. 2 is a view showing an example of a minute cross section of a pattern layer of the laminate sheet.

An arbitrary cross section (a) in the pattern layer 5 shown in FIG. 1 is considered now. An example thereof is shown in FIG. 2. This cross section (a) has a shape composed of: a straight line segment (b) with a length of w, which is formed on a face of the pattern layer 5 on the side in contact with the resin layer 2; a straight line segment (c) with a length of h1 and a straight line segment (d) with a length of h2, which extend from the both ends of the straight line segment (b) vertically in the thickness direction of the pattern layer 5; and a curved line segment (e) constituted of sequentially connected curves with different radii of curvature, which is formed on the surface of the pattern layer 5. Next, when a cross section (g) which is apart by a minute distance (Δf) from the cross section (a) and is parallel to the cross section (a) is given, the cross section (g) is composed of: a straight line segment (b') with a length of w; a straight line segment (c') with a length of h1' and a straight line segment (d') with a length of h2', which extend from the both ends of the straight line segment (b') vertically in the thickness direction of the pattern layer 5; and a curved line segment (e') constituted of sequentially connected curves with different radii of curvature, which is formed on the surface of the pattern layer 5. In this embodiment, a structure that satisfies at least one of the following conditions is provided: (1) the lengths of the straight line segments (c) and (c') are different (h1≠h1'); (2) the lengths of the straight line segments (d) and (d') are different (h2≠h2'); and (3) the radii of curvature or the lengths of the curves constituting the curved line segment (e) and those of the curves constituting the curved line segment (e') are different. In other words, in comparison between the two cross sections described above, among the three straight line segments and one curved line segment which compose each of the cross sections, at least any one of the lengths of the two straight line segments in the thickness direction and the curved line segment constituted of sequentially connected curves with different radii of curvature which is formed on the surface of the pattern layer 5 is different between the two cross sections (a) and (g). That is, this means that the cross-sectional shapes of the cross section (a) and the cross section (g) are different. The pattern layer 5, which constitutes the laminate sheet 1 of this embodiment and whose thickness is continuously varied, is continuously varied in the cross-sectional shape in an arbitrary cross section having a fixed width of w. The cross-sectional areas of the cross section (a) and the cross section (g) may be the same or different, but preferably the cross-sectional shapes and the cross-sectional areas are different, and it is preferred that the cross-sectional shape and the cross-sectional area are continuously varied. Such variation occurs in a minute distance, and there may be cross sections having the same cross-sectional shape or the same cross-sectional area in a wide range. Here, the w may be set to, for example, 500 μm, and the minute distance (Δf) is within the range of, for example, 35 to 70 μm.

The method for laminating the pattern layer 5 is not particularly limited. The layer may be laminated by a heretofore known method, such as screen printing, photogravure, and ink jet printing. Among others, an ink jet printing method is preferred since the cross-sectional shape and the cross-sectional area in an arbitrary cross section of the pattern layer 5 can be continuously varied relatively easily.

The laminate sheet 1 obtained in the above manner is integrated with the molded resin layer 6 using a molding method described below, thereby forming the molded body 7.

As the molding method for integrating the laminate sheet 1 with the molded resin layer 6 to form the molded body 7, injection molding is preferred. As injection molding, in addition to general injection molding, injection compression molding and injection press molding are exemplified. As a processing method of the molded body 7 according to one embodiment, a film insert molding method comprising a first step of pre-shaping the laminate sheet 1, and a second step of subsequently subjecting the pre-shaped laminate sheet 1 to injection molding is exemplified.

In the pre-shaping of the first step, a shaped body is produced by shaping the laminate sheet 1 into a desired design shape using a heat molding method such as vacuum molding and pressure molding. The vacuum molding herein is a method comprising preheating a film to be decorated to a temperature enabling heat shaping in advance, and sucking the film into a mold under a reduced pressure to stretch the film while pressing the film against the mold with cooling to shape the film. The pressure molding herein is a method comprising preheating a film to be decorated to a temperature enabling heat shaping in advance, and pressurizing the film from the opposite side of the mold to press the film against the mold with cooling to shape the film. The pressure reduction and the pressurization may be performed simultaneously.

Figure 8:
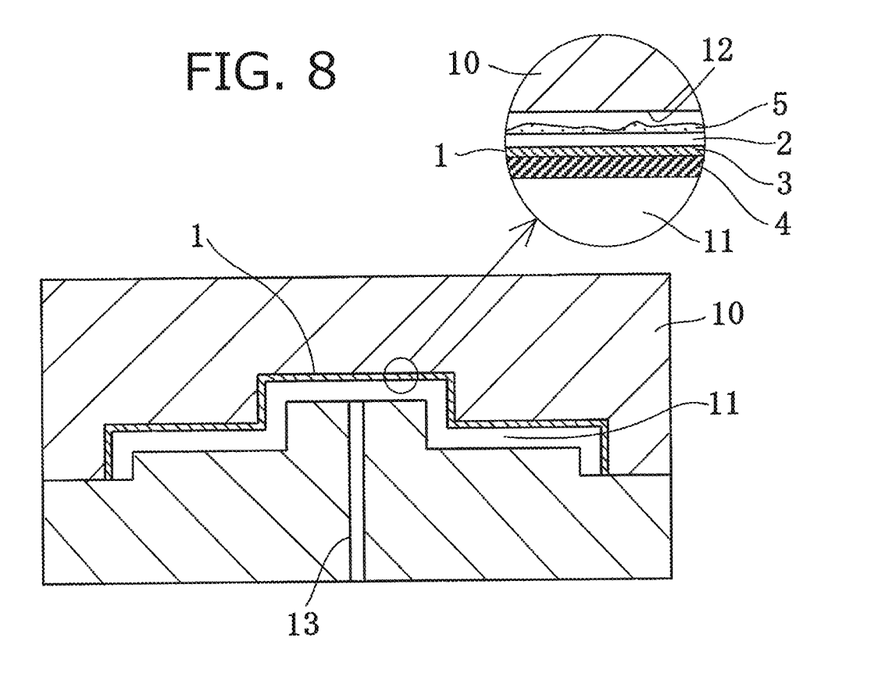
FIG. 8 is a cross-sectional view at the time of molding, of a molded body produced using the laminate sheet.

In the injection molding of the second step, the shaped body is placed in a mold cavity and a molten resin is injected therein to integrate the shaped body with the molded resin layer 6. Specifically, in the injection molding, as shown in FIG. 8, the laminate sheet 1 is placed in a cavity 11 of a mold 10 so that the pattern layer 5 side thereof faces a mold cavity surface 12, after the mold 10 is closed, a resin is injected into the backing layer 4 side of the laminate sheet 1 through a gate portion 13. Therefore, the molded resin layer 6 is formed while pressing the pattern layer 5 side of the laminate sheet 1 against the mold cavity surface 12. In this manner, the molded body 7 as described above in which the laminate sheet 1 is integrated with the molded resin layer 6 is obtained. Incidentally, the temperature of the molten resin in the injection molding may be, for example, 180 to 320° C., or may be 200 to 300° C.

A resin for use in the molded body 7, that is, a resin for forming the molded resin layer 6 is not particularly limited, and a known thermoplastic resin, for example, a polyolefin resin such as polyethylene and polypropylene; polystyrene resin; polyvinyl chloride resin; poly(meth)acrylate resin; acrylic resin; polyacetal resin; a polyester resin such as polyethylene terephthalate and polybutylene terephthalate; a polyamide resin; a polycarbonate resin; a polyphenylene sulfide resin; a polyimide resin; and the like may be used. These resins may be used alone or in mixture of two or more thereof.

Figure 3:
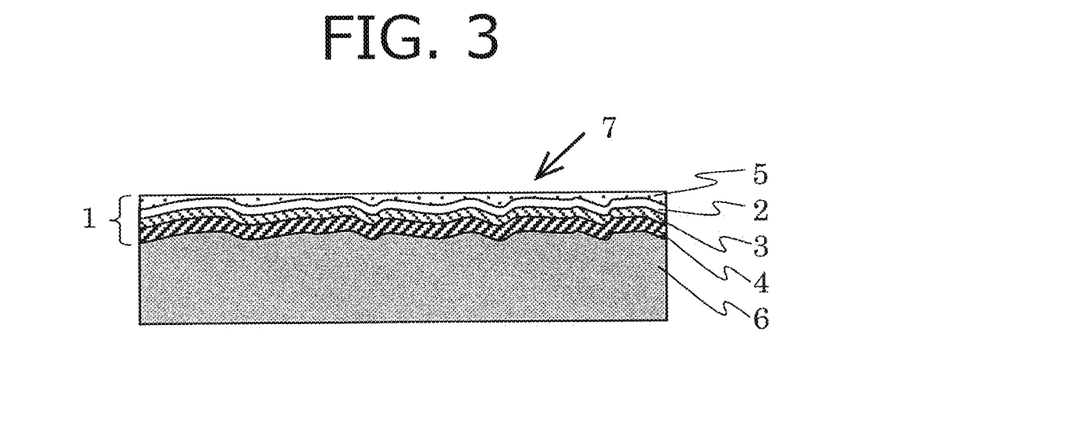
FIG. 3 is a cross sectional view schematically showing an embodiment of a molded body in which the laminate sheet is integrated with a molded resin layer.

In the molded body 7 thus obtained, as shown in FIG. 3, the surface of the pattern layer 5 is flat (that is, even or smooth), and the backing layer 4 is in contact with the molded resin layer 6. Also, the interface between the pattern layer 5 and the resin layer 2, the interface between the resin layer 2 and the colored layer 3, and the interface between the colored layer 3 and the backing layer 4 have concavo-convex shapes (that is, uneven shapes) which are parallel to one another. The reason of causing such a shape will be described.

As shown in FIG. 1, the pattern layer 5 has a concavo-convex surface on a side not in contact with the resin layer 2, that is, on the front surface side before the molded body 7 is formed. However, upon forming the molded body 7 by a molding method such as injection molding, the pattern layer 5 side of the laminate sheet 1 is pressed against the mold cavity surface 12 while being softened under the effect of the high temperature and the high pressure of the resin for forming the molded resin layer 6 injected onto the backing layer 4 side. At this time, the concavo-convex shape of the surface of the pattern layer 5 in contact with the mold cavity surface 12 is made flat so as to follow the mold cavity surface 12 finished to a flat surface.

On the other hand, a group of other layers constituting the laminate sheet 1, that is, a group of the resin layer 2, the colored layer 3 and the backing layer 4 is made of materials having softening temperatures lower than that of the pattern layer 5. Accordingly, in the pattern layer 5, the surface which has a concavo-convex shape becomes flat while the group of the other layers becomes more softened, and therefore the pattern layer 5 is embedded in the group of layers. That is, the convex portion of the surface of the pattern layer 5 is pressed against the mold cavity surface 12 to be pushed into the same level as the concave portion to make the surface flat, and at the same time, a convex shape of the pattern layer 5 is formed on the other side of the pattern layer 5 on which the pattern layer 5 is in contact with the resin layer 2. The pattern layer 5 originally had a concavo-convex surface on the side not in contact with the resin layer 2, but through this reshaping, the interface between the pattern layer 5 and the resin layer 2 is necessarily reshaped into a concavo-convex shape. The interface between the resin layer 2 and the colored layer 3 is also reshaped into a concavo-convex shape in the same manner. Here, the thickness of the resin layer 2 is constant, and therefore the interface between the resin layer 2 and the colored layer 3 and the interface between the pattern layer 5 and the resin layer 2 are made into concavo-convex shapes parallel to each other.

Similarly, the reshaping is transmitted to the interface between the colored layer 3 and the backing layer 4 and the interface between the backing layer 4 and the molded resin layer 6. That is, the interface between the colored layer 3 and the backing layer 4 and the interface between the backing layer 4 and the molded resin layer 6 are also made into concavo-convex shapes parallel to the interface between the pattern layer 5 and the resin layer 2. Accordingly, when the molded body 7 is formed by a molding method such as injection molding, in the laminate sheet 1, as shown in FIG. 3, a state where the surface of the pattern layer 5 is flat and where the interface between the pattern layer 5 and the resin layer 2, the interface between the resin layer 2 and the colored layer 3, and the interface between the colored layer 3 and the backing layer 4 have concavo-convex shapes which are parallel to one another (that is, spaced apart with a fixed distance therebetween) is obtained.

Figure 5:
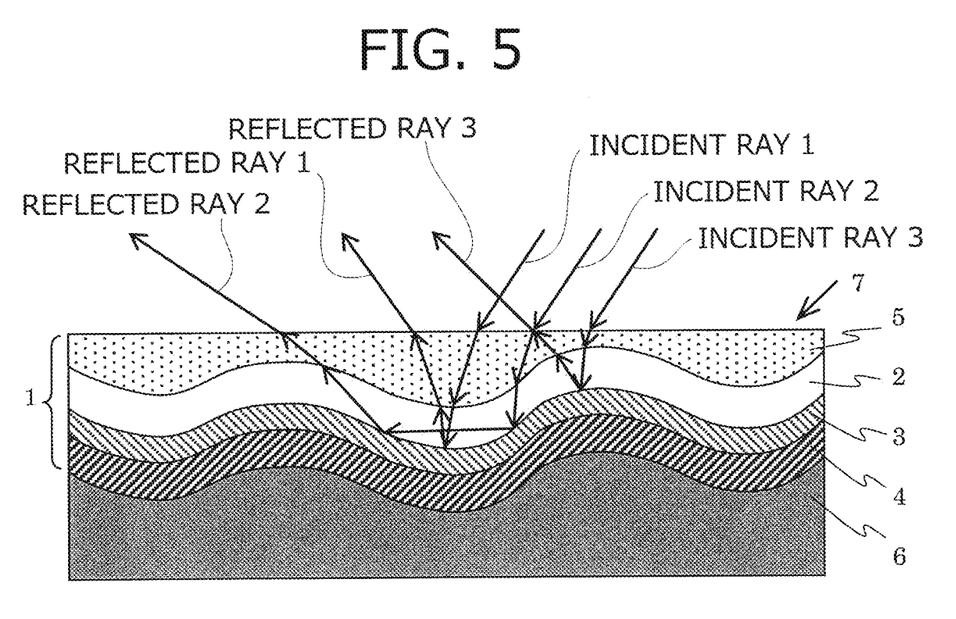
FIG. 5 is a view showing an example of reflection of rays in the molded body.

As described above, since the thickness of the pattern layer 5 is continuously varied, as shown in FIG. 5, the shape of the interface between the resin layer 2 and the colored layer 3 is made to a concavo-convex shape formed by a curved surface having various normal directions. When the curved surface is illuminated with light, the light is diffusely reflected in various directions, and when the incident angle of the light or the viewing position is only slightly changed, the composite appearance of the resin layer 2 and the colored layer 3 viewed through the pattern layer 5 is changed. Accordingly, it is possible to express a unique design by the combination of the depth feeling attributed to the thickness variation of the pattern layer itself and the three-dimensionality which is felt by the diffuse reflection of light on the curved surface of the concavo-convex shape.

Figure 4:
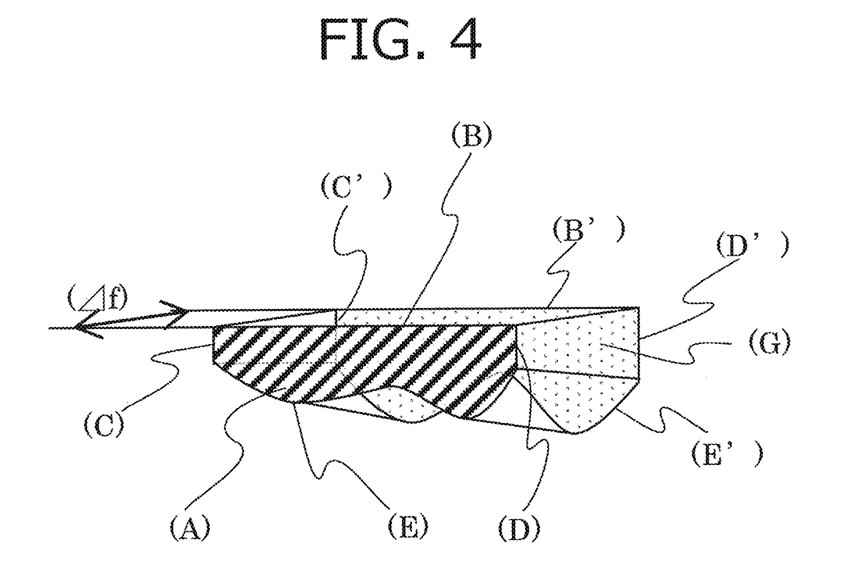
FIG. 4 is a view showing an example of a minute cross section of a pattern layer of the molded body.

At the time when the molded body 7 is formed, the pattern layer 5 has continuously varied thickness, and cross-sectional shapes of the pattern layer 5 in plural cross sections which are parallel to each other are different. This point is the same as before the formation of the molded body 7. However, after the formation of the molded body 7, the surface of the pattern layer 5 is flat and the interface thereof with the resin layer 2 has a concavo-convex shape. Therefore, the shape of the pattern layer 5 after the formation of the molded body 7 is as described below with reference to FIG. 4. That is, an arbitrary cross section (A) of the pattern layer 5 has a shape composed of: a straight line segment (B) with a length of w, which is formed on the surface of the pattern layer 5; a straight line segment (C) with a length of H1 and a straight line segment (D) with a length of H2, which extend from the both ends of the straight line segment (B) vertically in the thickness direction of the pattern layer 5; and a curved line segment (E) constituted of sequentially connected curves with different radii of curvature, which is formed on the interface between the pattern layer 5 and the resin layer 2. A cross section (G) which is apart by a minute distance (Δf) from the cross section (A) and is parallel to the cross section (A) is composed of: a straight line segment (B') with a length of w; a straight line segment (C') with a length of H1' and a straight line segment (D') with a length of H2', which extend from the both ends of the straight line segment (B') vertically in the thickness direction of the pattern layer 5; and a curved line segment (E') constituted of sequentially connected curves with different radii of curvature, which is formed on the interface between the pattern layer 5 and the resin layer 2. In this embodiment, a structure that satisfies at least one of the following conditions is provided: (1) the lengths of the straight line segments (C) and (C') are different (H1≠H1'); (2) the lengths of the straight line segments (D) and (D') are different (H2≠H2'); and (3) the radii of curvature or the lengths of the curves constituting the curved line segment (E) and those of the curves constituting the curved line segment (E') are different. Accordingly, the cross-sectional shapes of the cross section (A) and the cross section (G) are different, that is, the pattern layer 5 having continuously varied thickness constituting the molded body 7 of this embodiment is continuously varied in the cross-sectional shape (preferably, a cross-sectional shape and a cross-sectional area) in an arbitrary cross section having a fixed width of w. Incidentally, the dimensions of w and Δf are the same as in the laminate sheet 1 mentioned above.

The use of the molded body 7 is not particularly limited, and may be used for forming various products or parts, such as, for example, home electrical appliances, interior parts of automobiles, communication apparatuses, office automation apparatuses, and building materials.

The measurements of the optical transmittance, the thickness, and the softening temperature of the respective layers herein are performed as follows.

Optical transmittance: only a layer to be measured in the laminate sheet is molded into a film alone, and the resulting film is used to measure a spectrum of optical transmittance with a spectrophotometer (KONICA MINOLTA, CM-3600d). The thickness of the film produced is made to be the thickness of the layer to be measured in the laminate sheet. The measurement is performed in the wavelength range of 400 to 700 nm, and an average value in the range is calculated. For each layer, 10 sheets of film are produced and measured to calculate the average value, whereby the optical transmittance is obtained. The optical transmittance of the laminate having a combination of a resin layer and a pattern layer is measured using a laminate in a film shape produced by laminating the resin layer and the pattern layer so as to correspond to the respective thicknesses in the laminate sheet.

Thickness: a vertical cross section of the laminate sheet 1 is observed with a microscope (Keyence Corporation, digital HF microscope VH-8000), and thicknesses at arbitrary 10 points of the layer to be measured are measured to calculate the average value.

Softening temperature: only a layer to be measured in the laminate sheet is molded into a film alone in a desired thickness (that is, a thickness of the layer to be measured in the laminate sheet), and this film is cut into a desired size (5 mm square in Examples below). The resulting film is measured using a needle penetration method (load: 100 mN, needle diameter: ϕ1 mm, temperature elevation speed: 5° C./min) by the thermomechanical analysis (TMA). For each layer, 10 sheets of film are produced and measured to calculate the average value thereof.

EXAMPLES

The present invention will be described in more detail below, but the invention is not to be limited to the following examples.

Example 1

Production of Pattern Layer Ink (Formulation of Pigment Mother Liquid)
1) Carbon black pigment; 15 parts by mass
(trade name "NIPex 35", Evonik Degussa Japan)
2) Dispersant; 7.5 parts by mass
(trade name "SOLSPERSE 32000", The Lubrizol Corporation)
3) Reactive monomer; 77.5 parts by mass
(trade name "SR9003", propoxylated(2) neopentyl glycol diacrylate, Sartomer Japan)

The above materials were mixed with a mixer to produce a pigment mother liquid.

(Formulation of Pattern Layer Ink)
1) Pigment mother liquid produced above; 13 parts by mass
2) Aliphatic urethane acrylate oligomer; 10 parts by mass
(trade name "CN996", ARKEMA)
3) Tetrahydrofurfuryl acrylate; 10 parts by mass
(trade name "V #150", Osaka Organic Chemical Industry)
4) Acrylmorpholine; 60 parts by mass
(trade name "ACMO", KOHJIN)
5) 2-(1,2-Cyclohexanedicarboxyimide)ethylacrylate; 5 parts by mass
(trade name "ARONIX M-140", TOAGOSEI)
6) 2-Hydroxy-2-methyl-1-phenyl-propan-1-one; 5 parts by mass
(trade name "DAROCUR 1173", BASF)
7) Bis(2,4,6-trimethylbenzoyl)-phenylphosphine oxide); 5 parts by mass (trade name "Irgacure 819", BASF)

The above materials were mixed with a mixer to produce a pattern layer ink.

As a resin layer, a transparent film (thickness: 75 μm, optical transmittance: 95% (400 to 700 nm), softening temperature: 100° C.) made of an acrylic resin was used.

A polyester resin was applied on one surface of the resin layer with a reverse roll coater and treated in a dryer to form a polyester resin layer. Subsequently, indium was deposited on the surface of the polyester resin layer by a vacuum deposition process to form a metal evaporated layer, thereby forming a composite colored layer.

Next, a sheet made of an acrylonitrile butadiene styrene resin was laminated on the surface of the composite colored layer by a heat lamination process, thereby forming the backing layer.

On the resin layer side of the obtained laminate, that is, on the other surface of the resin layer, a wood grain pattern was added with the pattern layer ink produced above by printing equipment of a serial ink jet method. After adding the pattern, the laminate was irradiated with UV light using a UV lamp to cure the ink, thereby forming a pattern layer having a wood grain pattern and having on the surface thereof a curved surface of a concavo-convex shape. A laminate sheet was obtained in this manner. The composite colored layer of the obtained laminate sheet had a thickness of 30 μm, an optical transmittance of 5% (400 to 700 nm), and a softening temperature of 100° C., and the backing layer had a thickness of 250 μm, an optical transparency of 0% (400 to 700 nm), and a softening temperature of 70° C. The printing conditions and the UV irradiation conditions were as follows.

Figure 6A:
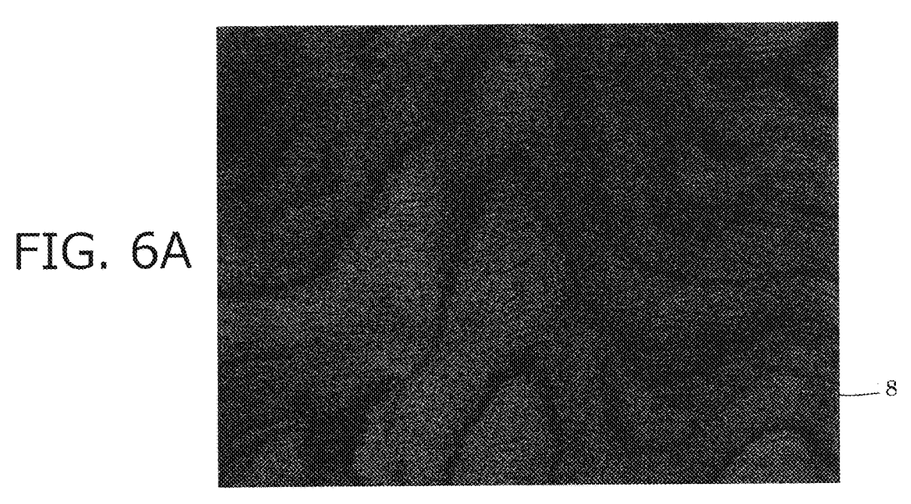
FIG. 6A is an image of a wood grain pattern and FIG. 6B is an image of the same after subjected to a gray-scale conversion.
Figure 6B:
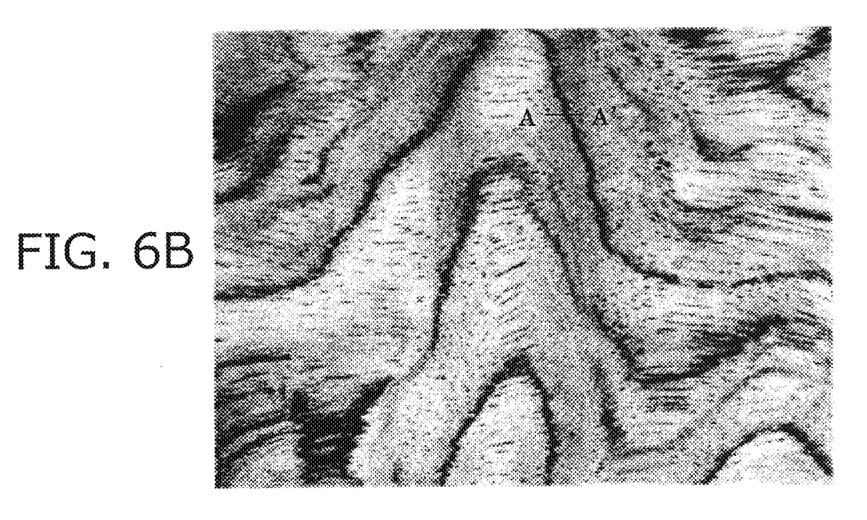
Figure 7:
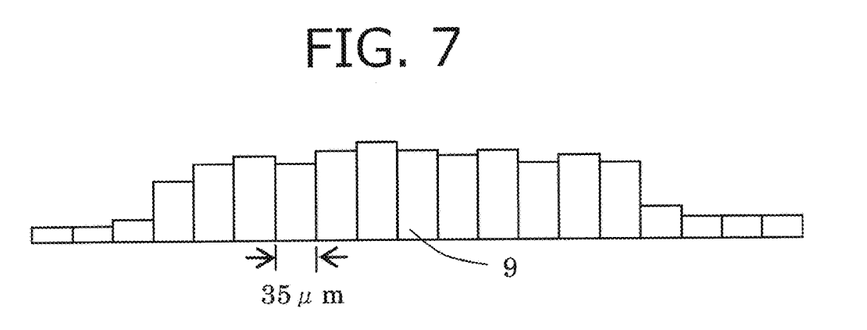
FIG. 7 is a diagram for explanation of digital data of a wood grain pattern.

(Printing Conditions)
Head heating temperature: 57° C.
Nozzle diameter: 70 μm
Applied voltage: 50 V
Pulse width: 15 μs
Drive frequency: 4.5 kHz
Resolution: 720 dpi
Pattern: wood grain pattern (UV Irradiation Conditions)
Lamp type: metal halide lamp
Lamp output: 120 W/cm
Irradiation time: 1 sec
Irradiation number: 20
Irradiation distance: 5 mm The conditions for forming the pattern layer having the concavo-convex curved surface with the wood grain pattern was as follows. First, a wood grain pattern 8 as shown in FIG. 6A was read with a scanner, the image thus read was converted into gray-scale (see, FIG. 6B), digital image data in which the thickness of the pattern layer was varied so that a portion having a lower brightness in the gray-scale had a larger thickness, whereas a portion having a higher brightness had a smaller thickness, was produced and used. For example, in a cross section A-A' in FIG. 6B, the segment was divided into rectangles 9 having a minute width of 35 μm as shown in FIG. 7, and printing was performed by printing equipment of an ink-jet method while controlling the application amount so that the rectangles 9 with the minute width had variation in height between 10 to 100 μm. In this manner, variation was imparted in the thickness of the pattern layer so as to make a darker colored portion correspond to a larger thickness of the pattern layer and a lighter colored portion correspond to a smaller thickness of the pattern layer. The pattern layer formed by a UV irradiation after the printing had continuously varied thickness and the surface thereof was a smooth curved surface. That is, the pattern layer had a shape in which the upper edge in an arbitrary cross section is constituted of sequentially connected plural curves having different radii of curvature, and which is continuously varied in the cross-sectional shape and cross-sectional area of an arbitrary cross section. The optical transmittances (400 to 700 nm) of the laminate having a combination of the resin layer and the pattern layer were values in the range of 20 to 85% in portions having a depth feeling and values in the range of 3 to 8% in a portion not having a depth feeling. The softening temperature of the pattern layer was 150° C. The radii of curvature of the plural curves constituting an upper edge of a cross section of the pattern layer were from 35 μm to 80 mm. Thickness of the pattern layer (the average value of thicknesses at arbitrary 10 points) was 70 μm, with the thickness at the thinnest portion being 10 μm and the thickness at the thickest portion being 100 μm.

Next, the laminate sheet was pre-shaped by a vacuum pressure molding method so that the pattern layer was on the front surface side of the molded body, thereby obtaining a shaped body having a shape following an inner surface of a mold cavity for injection molding. Unwanted portions of the shaped body were cut off, the shaped body was set to follow the inner surface of the mold cavity for injection molding, a resin was injected on the backing layer side, thereby obtaining a molded body in which the laminate sheet was integrated with a molded resin layer. The conditions of the injection molding in the production of the molded body were as follows. That is, the resin for forming the molded resin layer was an alloy material of a polycarbonate and an ABS resin, T-2711 manufactured by Teijin Chemicals, the resin temperature was 260° C., the mold temperature was 40° C., and the injection pressure was 200 MPa. In the obtained molded body, the surface thereof was flat, and a three-dimensionality and variation thereof which are attributed to the thickness variation of the pattern layer, and a depth feeling attributed to the composite visual variation due to the overlap of the pattern layer and the colored layer were imparted, whereby the molded body had a novel and unique design having a wood grain pattern of a natural substance with a metallic gloss added thereto.

Comparative Example 1

A laminate sheet and a molded body were obtained in the same manner as in Example 1 except that the softening temperature of the pattern layer was 33° C. In the resulting molded body, the surface thereof was not flat and the concavo-convex shape remained (see FIG. 8). By the influence of the remaining concavo-convex shape, the depth feeling attributed to the composite action of the pattern layer and the colored layer was absent and the design was not excellent. The method for producing the ink used for adding the pattern layer is described below.

[Production of Pattern Layer Ink in Comparative Example 1]
(Formulation of Pattern Layer Ink)
1) Pigment mother liquid the same as in Example 1; 13 parts by mass
2) Aliphatic urethane acrylate oligomer; 10 parts by mass (trade name "CN996", ALKEMA)
3) Tetrahydrofurfuryl acrylate; 50 parts by mass (trade name "V #150", Osaka Organic Chemical Industry)
4) Acrylmorpholine; 20 parts by mass (trade name "ACMO", KOHJIN)
5) 2-(1,2-Cyclohexanedicarboxyimide)ethylacrylate; 5 parts by mass (trade name "ARONIX M-140", TOAGOSEI)
6) 2-Hydroxy-2-methyl-1-phenyl-propan-1-one; 5 parts by mass (trade name "DAROCUR 1173", BASF)
7) Bis(2,4,6-trimethylbenzoyl)-phenylphosphine oxide); 5 parts by mass (trade name "Irgacure 819", BASF)

The above materials were mixed with a mixer to produce a pattern layer ink.

Comparative Example 2

Figure 9:
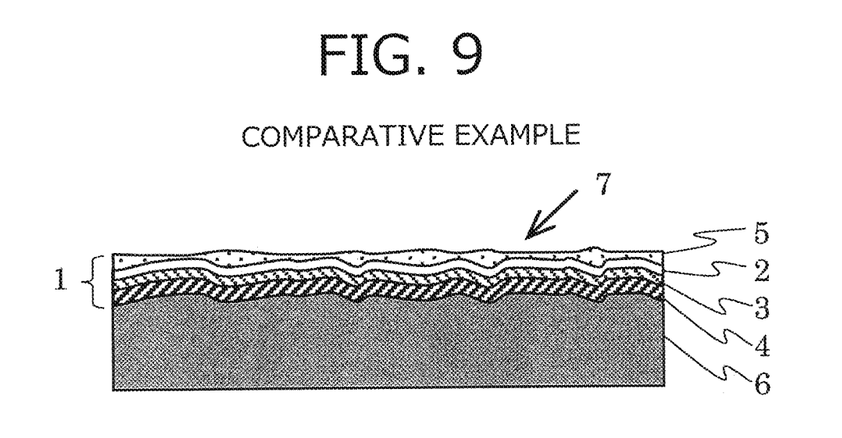
FIG. 9 is a cross sectional view schematically showing a molded body obtained in Comparative Examples 1 and 2.

A laminate sheet and a molded body were obtained in the same manner as in Example 1 except that a transparent film (thickness: 200 μm, optical transmittance: 88% (400 to 700 nm), softening temperature: 150° C.) made of a polycarbonate resin was used as the resin layer. In the resulting molded body, the surface thereof was not flat and the concavoconvex shape remained (see FIG. 9). By the influence of the remaining concavo-convex shape, the depth feeling attributed to the composite action of the pattern layer and the colored layer was absent and the design was not excellent.

As is shown by the above results, the molded body obtained by the embodiments had an excellent design in which the surface thereof was flat and a pattern layer therein showed a three-dimensionality and variation thereof, and further showed a depth feeling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A molded body comprising:
a patterned laminate sheet comprising:
an optically transparent resin layer of uniform thickness and which has a softening temperature of 120° C. or lower;
a light-reflecting colored layer laminated on one surface of the optically transparent resin layer and having a softening temperature of 120° C. or lower;
a backing layer laminated on the colored layer and having a softening temperature of 120° C. or lower; and
a pattern layer which is laminated on the other surface of the optically transparent resin layer, has a colored pattern formed by a cured ionizing radiation curable resin ink containing a colorant, has optical transparency and has a softening temperature of 140 to 160° C.; and
a molded resin layer integrated with the laminate sheet with the molded resin layer being in contact with the backing layer,
wherein a face of the pattern layer facing away from the optically transparent resin layer is smooth and even and is a face of the molded body, and an interface is formed by a face of the pattern layer facing and contacting a face of the optically transparent resin layer and is comprised of irregularly arrayed curvilinear convexes and concaves, and thickness of the pattern layer is continuously irregularly varied,
wherein an interface is formed by a face of the light-reflecting colored layer facing and contacting a face of the optically transparent resin layer and is comprised of irregularly arrayed curvilinear convexes and concaves parallel to the irregularly arrayed curvilinear convexes and concaves of the interface between the pattern layer and the optically transparent resin layer, and
wherein the patterned laminate sheet has only one pattern layer and the one pattern layer is said pattern layer having the pattern formed by the cured ionizing radiation curable colored resin ink and the pattern of the patterned laminate sheet is given by the change in thickness of the pattern layer.

2. The molded body according to claim 1, wherein an interface is formed by a face of the light-reflecting colored layer facing and contacting a face of the backing layer and is comprised of irregularly arrayed curvilinear convexes and concaves parallel to the irregularly arrayed curvilinear convexes and concaves of the interface between the pattern layer and the optically transparent resin layer and parallel to the irregularly arrayed curvilinear convexes and concaves of the interface between the light-reflecting colored layer and the optically transparent resin layer.

3. The molded body according to claim 1, wherein the light-reflecting colored layer has optical transparency lower than those of the optically transparent resin layer and the pattern layer.

4. The molded body according to claim 1, wherein the softening temperature of the backing layer is lower than those of the optically transparent resin layer and the light-reflecting colored layer.

5. The molded body according to claim 1, wherein the pattern is a wood grain pattern and thickness of the pattern layer varies inversely with brightness of a gray-scale image of a wood grain, which gray-scale image is obtained by reading a wood grain with a scanner and converting the image thus read into the gray-scale.

6. A method for producing a molded body according to claim 1, comprising:
sequentially laminating a colored layer having a softening temperature of 120° C. or lower and a backing layer having a softening temperature of 120° C. or lower on one surface of a resin layer having optical transparency and having softening temperature of 120° C. or lower; and
subsequently applying an ionizing radiation curable resin ink containing a colorant on the other surface of the resin layer, and irradiating the ionizing radiation curable resin ink with an ionizing radiation, thereby forming a pattern layer which is colored and has optical transparency and a softening temperature of 140 to 160° C., whose surface has a concavo-convex shape, and whose thickness is continually varied, thereby to produce a laminate sheet; and
placing the laminate sheet in a mold cavity with the pattern layer side of the laminate sheet facing a mold cavity surface;
injecting a resin on the backing layer side of the laminate sheet; and
molding the molded resin layer while pressing the pattern layer side against the mold cavity surface.

* * * * *